US 7,383,331 B2

(12) United States Patent
Takahashi et al.

(10) Patent No.: US 7,383,331 B2
(45) Date of Patent: Jun. 3, 2008

(54) NETWORK SERVER LOAD DETECTION SYSTEM, SHARING SYSTEM AND METHOD

(75) Inventors: Eiichi Takahashi, Kawasaki (JP); Takeshi Aoki, Tama (JP); Ken Yokoyama, Kawasaki (JP); Shinji Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 09/800,488

(22) Filed: Mar. 8, 2001

(65) Prior Publication Data

US 2001/0029545 A1 Oct. 11, 2001

Related U.S. Application Data

(63) Continuation of application No. PCT/JP99/03692, filed on Jul. 8, 1999.

(30) Foreign Application Priority Data

Sep. 8, 1998 (JP) .................. 10-254318

(51) Int. Cl.
G06F 15/173 (2006.01)
(52) U.S. Cl. .................. 709/224; 370/229; 718/105
(58) Field of Classification Search ................ 709/229, 709/243, 244, 227, 226, 230–235, 252, 224, 709/223; 370/229–236, 237; 718/100, 102–105
See application file for complete search history.

(56) References Cited

U.S. PATENT DOCUMENTS

| 5,193,151 A | * | 3/1993 | Jain | 709/237 |
| 5,341,477 A | | 8/1994 | Pitkin et al. | |
| 5,400,329 A | * | 3/1995 | Tokura et al. | 370/232 |
| 5,459,837 A | | 10/1995 | Caccavale | |
| 5,774,660 A | | 6/1998 | Brendel et al. | |
| 5,774,668 A | | 6/1998 | Choquier et al. | |
| 5,933,606 A | * | 8/1999 | Mayhew | 709/239 |
| 5,943,480 A | * | 8/1999 | Neidhardt | 709/226 |
| 5,987,493 A | * | 11/1999 | Rangan et al. | 718/105 |

(Continued)

FOREIGN PATENT DOCUMENTS

| EP | 0 459 134 A2 | 12/1991 |
| EP | 459134 A2 * | 12/1991 |
| JP | 8-163206 | 6/1996 |
| JP | 9-282287 | 10/1997 |
| JP | 10-224356 | 8/1998 |
| JP | 10-262044 | 9/1998 |
| WO | WO 98/18076 | 4/1998 |

OTHER PUBLICATIONS

Jacobson et al., "Congestion Avoidance and Control", 1992 revised version of a paper presented at SIGCOMM '88. Printed from ee.lbl.gov/nrg-papers.html.*
Hunt et al., Network Dispatcher: a connection router for scalable Internet services, Computer Networks and ISDN Systems, 1998, pp. 347-357.

(Continued)

Primary Examiner—Saleh Najjar
Assistant Examiner—David Lazaro
(74) Attorney, Agent, or Firm—Staas & Halsey LLP

(57) ABSTRACT

In order to measure the load on a server and perform its allotment with high efficiency, the communication from a client to a server is monitored. The communication data size per connection is measured as the load on the server, the change of the communication data size per connection is detected, the maximum is recorded, and if the communication data size decreases at the time when the maximum is detected, the load on the server is judged to be heavy.

9 Claims, 13 Drawing Sheets

U.S. PATENT DOCUMENTS

| | | | |
|---|---|---|---|
| 6,070,191 A * | 5/2000 | Narendran et al. | 709/226 |
| 6,104,717 A * | 8/2000 | Coile et al. | 370/401 |
| 6,219,712 B1 * | 4/2001 | Mann et al. | 709/235 |
| 6,263,368 B1 * | 7/2001 | Martin | 709/224 |
| 6,535,482 B1 * | 3/2003 | Hadi Salim et al. | 370/229 |
| 6,643,259 B1 * | 11/2003 | Borella et al. | 370/231 |
| 6,757,255 B1 * | 6/2004 | Aoki et al. | 370/252 |

OTHER PUBLICATIONS

Communication dated Dec. 12, 2002 from the European Patent Office including Supplemental Partial European Search Report and Lack of Unity of Invention. Sheet B (2 pages).

Japanese Patent Office Action for corresponding Japanese Patent Application No. 2001-372976, mailed Dec. 17, 2002, and English Translation.

H. Inoue et al., "Implementation of Load Balancing WWW Server using NAT", Information Process Society, Sep. 27, 1996, vol. 96, No. 95, p. 19-24, with an English Abstract.

Y. Kiyosue et al., "The Architecture of InterSpace", NTT, R&D, Denki Tsushin Kabushiki Kaisha, Apr. 10, 1998, vol. 47, No. 4, p. 459-464, with an English Abstract.

Communication including Search Report dated Sep. 9, 2004 from the European Patent Office in the corresponding European Patent Application.

* cited by examiner

NETWORK SERVER LOAD DETECTION SYSTEM, SHARING SYSTEM AND METHOD

This is a continuation of Application PCT/JP 99/03692, Filed on Jul. 8, 1999, now abandoned.

TECHNICAL FIELD

The present invention relates generally to sharing of server resources, and more particularly to a method of sharing services to servers for performing network services.

BACKGROUND ARTS

With a rapid spread of the Internet and Intranet over the recent years, an efficient utilization and service stability of a network service server have been requested. Optimum sharing of the services to the servers is indispensable for the efficient utilization and stable service supply of the servers, and, for attaining this optimum sharing, it is required that a load of the server be accurately recognized.

The followings are known methods of recognizing the load of the server in the prior art.

(1) Agent Method

This is a method in which a program for counting an activity ratio of resources such a CPU, a memory etc is installed into the server. When an agent itself increases the server load and communicates with the outside, there occurs an interference with a load measuring accuracy by the agent such as consuming a band therefor. Further, the agent program must be installed into the server, and hence there arises a problem of being lack of a general-purpose characteristic and large in instruction cost.

(2) Load Measurement Communication Method

This is a method of issuing a ping command to the server and performing a pseudo service communication therewith, and obtaining a server load from a response time. The communication for the measurement, however, consumes a band on the route, and the server is also burdened with a load for the response, resulting in an interference with the load measurement. Further, the server is required to support a protocol etc used for the measurement, and there is still the problem of being lack of the general-purposed characteristic.

(3) Counting Method of VC count, Connection Time, Connection Frequency, Connection Error Rate and Response Time This is a method of obtaining the server load from a VC count, a connection time, a connection frequency, a connection error rate and a response time with respect to the server, which are counted during a routing process in a router for routing a packet from a client to the server. This method is, however, based on a behavior of the server when establishing the connection, and therefore an error is large. A large quantity of connections are needed for enhancing the accuracy, so that this method is not suited to the services where a large amount of communications are performed with a small number of connections. Further, the routing is indispensable, and hence a problem is that a throughput of the server is restricted by a throughput of the counting method.

(4) Hit Count/Hit Rate Calculation Method

This is a method in which an access count (hit count) and an access frequency (hit rate) are counted per content such as an access target file by checking the packets to a WWW server, and the server load is obtained from a result of this counting. This method needs a packet analyzing process per protocol for specifying the access target file and is incapable of corresponding to a new service. Moreover, a performance of the server must be already known. There is no alternative but to obtain the server performance from catalog values or empirically in order to give the server performance beforehand. The server performance is, however, largely influenced by a system architecture and an operation mode. Therefore, a problem is that the catalog performance value based on the standard architecture and mode is not precise, and at least one trouble is inevitable when obtained empirically.

As explained above, any method is not capable of detecting the server load efficiently at a high speed without putting a burden on the server.

Further, the server load can not be thus accurately recognized, and it is therefore difficult to allocate the services provided by the server.

The following methods are proposed only in terms of sharing the services.

(5) Round Robin DNS Method

This is a method wherein, in DNS (Domain Name System) services, a mapping of one domain name to a plurality of IP addresses of the server is set in an entry table, in response to a client's request for an inquiry about the server IP address, the respective servers are allocated cyclically (Round Robin) according to the entry table, and the IP address of the allocated server is selected to respond to the client, thus sharing the services to the plurality of servers.

According to this Round Robin DNS method, however, the services can be shared only at an equal or simple service sharing rate, and each server must perform the service in accordance with the sharing rate allocated irrespective of its capability and dynamic load state. Therefore, there is a difference in the load sate between the servers, and the method is inefficient on the whole. Further, pieces of DNS inquiry information are normally cached on the client side, and hence a problem is that, even if the rate changes, this change can not be immediately reflected.

(6) Sharing Method Using Hash Table

This is a method of allocating entries in a Hash table for managing the connections to the servers, and the services are shared to the servers at a rate corresponding to the number of entries to be allocated.

In this method, to begin with, when the client makes a request for the service, the entry is determined from the client address and the service as well. This request is sent to the server to which that entry is allocated. Then, the services of which the number corresponds to a ratio of the number of entries allocated, are shared to the servers. Thus, the efficient utilization of the servers is actualized by allocating the many entries to the high-performance server or by re-allocating the entries to the server with the high load to servers having a comparatively low load.

According to this sharing method using the Hash table, however, a Hash function for generating a Hash value with no bias is necessary for properly reflecting a ratio of the number of Hash entries in the service sharing rate. In general, however, it is impossible to find out the Hash function for generating the Hash value with no bias with respect to all sorts of distributions of Hash keys (client addresses, port numbers etc). Further, the accuracy of the sharing rate is proportional to the number of Hash entries, and hence a multiplicity of entries are needed for enhancing the accuracy, resulting in more of consumption of storage resources (buffers) usable for managing the connections. There arises a problem that a large quantity of accesses can not be handled.

(7) Sharing Method Based on State and Performance of Server

This is a method of sharing the services of which a quantity corresponds to the load and a performance ratio by predicting a magnitude of the server load or predicting a performance ratio between the servers by counting a response time by issuing the ping command to the server and counting a connection time and a connection error rate during a routing process by routing the packet from the client.

According to this method, however, the services for whichever client are equally shared to the servers regardless of a throughput of the client, a length of the route to the client and a bandwidth, so that the utilization efficiency of the server can not be maximized.

A difference in the performance (especially, a speed) and the load of the server do not appear in QoS (Quality of Service) to the client with its route becoming a bottleneck due to a short or long bandwidth of the route and to the client having a low throughput.

Reversely, the difference in the performance and the load of the server exerts a great influence on QoS to the client connected to a near and high-speed line or to the client exhibiting a high throughput. Such being the case, there is a problem in which when trying sharing equally all the services for the clients, it follows that more server resources than needed to the clients are shared, or there is nothing but to share the deficient server resources.

As described above, the problems are inherent in both of the server load recognizing method and the server sharing method in the prior art.

The present invention, which was devised to obviate the above problems, aims at recognizing the server load efficiently at the high speed without putting any burden on the server, sharing the services in accordance with the dynamic load state in the server, accurately reflecting the service sharing rate obtained by setting and the adjustment in the service sharing, and maximizing the utilization efficiency of the server by sharing the services in a way of estimating the necessary server resources for every client.

DISCLOSURE OF INVENTION

To accomplish the above object, the present invention adopts the following architectures.

According to a first aspect of the present invention, a network server load detection method comprises a step of monitoring a communication from a client to a server, and counting a communication data size per connection as a load of the server, a step of detecting a change in the communication data size per connection, and recording a maximum value thereof, and a step of judging, if the communication data size per connection decreases at this point of time with respect to the maximum value, that the server is under a high load.

According to TCP (Transmission Control Protocol) etc, the server shares equally per connection the storage resources (buffers) for storing the packet data forwarded from the clients. Upon a next receipt, the server notifies the client a data size storable in the storage resource (buffer), and the client sends to the server the data having the size of which the server has notified.

Accordingly, the server, when coming to a high load, is incapable of immediately processing the data sent from the client, and hence all or some pieces of data remain stored in the storage resource (buffer) of the server. As a result, the server has no alternative but to notify the client of a data size smaller by the data remaining stored in the storage resource (buffer).

Accordingly, the data size per connection time on the communication line is detected, thereby detecting the high-load state of the server.

According to a second aspect of the present invention, the network server load detection method according to the first aspect may further comprises a step of counting a connection count and the communication data size till a count of communications monitored reaches a monitored communication minimum count and till a count time reaches a monitor minimum time by use of the monitored communication minimum count and the monitor minimum time.

According to a third aspect, the network server load detection method according to the first aspect may further comprise a step of recognizing the communications of a start and end of the connection, and excluding communication data sizes of the start and end of the connection from a load detection target.

The communication data of a start and an end of the connection, which are small and do not depend on the server load, are therefore excluded from counting a total communication data size, thereby yielding an effect of enhancing accuracies of measuring the load and judging the high load.

According to a fourth aspect of the present invention, the network server load detection method according to the first aspect may further comprise a step of retaining information of the communication of the start of connection till the connection is ended or established, a step of detecting a start-of-connection communication for re-connection executed when judging that the client fails to connect on the basis of the information retained, and a step of setting a rate at which the communication of the re-connection occupies the number of the communications of the start of connection as a load of the server and, if this rate is high, judging that the server is under the high load.

If the server load is large, the server comes not to send back a response notification to the connection request given from the client. Corresponding to this, the client comes to retransmit the connection request. Accordingly, the high load of the server can be judged by detecting the client's retransmission of the connection request on the communication line.

According to a fifth aspect of the present invention, the network server load detection method according to the first aspect may further comprise a step of obtaining a distribution of the communication data sizes from the clients, a step of distinguishing between extremely small pieces of communication data unrelated to the load of the server from the communication data size distribution, and a step of eliminating the extremely small pieces of communication data from the judgement about the load.

There is yielded an effect of enhancing the accuracies of measuring the load and detecting the high load by excluding the extremely small pieces of communication data unrelated to the server load out of counting.

According to a sixth aspect of the present invention, the network server load detection method according to the first aspect may further comprise a step of obtaining at least a sequence number from the communication to the server from the client, a step of retaining a maximum value of the sequence number till the connection is ended since the start of connection, a step of comparing the sequence number of the communication received with the sequence number retained, and a step of excluding, if the sequence number obtained from the communication is smaller than the sequence number retained, this communication from counting.

The sequence numbers are normally arranged in the ascending sequence, however, if a communication sequentiality is destructed or lost due to a congestion on the communication line, the ascending sequence is disordered. The server can not process the data after the data that do not arrive yet, and hence a data size receivable by the server becomes small irrespective of the server load. Then, a communication data size of the client decreases correspondingly. There is produced an effect of enhancing the accuracies of measuring the server load and detecting the high load by avoiding the influence of the route with the method described above.

According to a seventh aspect of the present invention, the network server load detection method according to the first aspect may further comprise a step of counting, if the sequence number obtained from the communication is smaller than the sequence number retained, the communication data after executing a weighting process thereon, or predicting a communication data size when there is no problem on a route from the two sequence numbers, and counting the predicted data size for detecting the load.

According to an eighth aspect of the present invention, a network server load detection method comprises a step of monitoring a communication to a client from a server, and counting a receivable data size and a connection count of which the server notifies the client, a step of obtaining the receivable data size per connection as a server load, a step of storing a maximum value of the receivable data size per connection, and judging, if the receivable data size per connection becomes small with respect to the maximum value, that the server is under a high load.

According to a ninth aspect of the present invention, a server load detection system for monitoring a communication to a server from a client and detecting a load state of the server, comprises a data size calculating module for calculating a size of communication data per connection, a storage unit for detecting a change in the communication data size per connection, and storing a maximum value, and a load detection module for detecting a high load of the server when the communication data size per connection at that point of time with respect to the maximum value is equal to or smaller than a fixed value.

According to a tenth aspect of the present invention, a network server sharing system for transferring data to a plurality of servers from a client via a network, comprises a routing unit for transferring the data transmitted from the client to any one of the servers in a way of changing a destination of the data, a connection management module for retaining a mapping between the data and the server and indicating the destination to the routing means, and a server sharing module for obtaining throughputs of the server, the client and a route by counting them, determining a correspondence between the data and the server by use of a function according to a service distribution rate based on the throughput, and transferring this correspondence to the connection management module.

The services are shared based on algorithms obtained by measuring the performance and load of the server and the performance and load on the side of the client, and it is therefore feasible to automatically correspond to a change in dynamic load state of the server. Further, there is an effect in which the servers necessary for keeping QoS as viewed from the client can be shared, and a utilization efficiency of the server can be maximized. A still further effect is that the server sharing is determined by use of a function, and hence a service sharing rate can be precisely reflected in the sharing. Moreover, a sufficient effect can be obtained only by the single connection management module.

According to an eleventh aspect of the present invention, the network server sharing system according to the tenth aspect, the server sharing unit sets, as the distribution rate, a modified probability distribution obtained by modifying a probability distribution corresponding to the throughput of the server so that the probability distribution is made more approximate to a uniform distribution as the throughputs of the client and of the route become lower.

A proportional relationship of how much degrees of the throughputs of the client and the route and the server's throughput have an influence on QoS, is reflected in the service sharing rate, and therefore an effect is such that the server exhibiting the high throughput is preferentially allocated to the client in which the server throughput has a large influence on QoS.

According to a twelfth aspect of the present invention, in the network server sharing system according to the tenth aspect, the server sharing unit obtains a distribution of the throughputs of the client and of the route with respect to the client that is now on the service, also obtains a modified probability distribution by executing such a modification as to make the probability distribution corresponding to the throughput of the server more approximate to the uniform distribution as the throughputs of a new-connected client and of the route become lower for the distribution and reversely make the throughput of the server more outstanding as the throughputs of a new-connected client and of the route become higher, and sets this modified probability distribution as a distribution rate.

The service sharing rate is adjusted in relation to a distribution of the throughputs of the on-service client and the route, and hence an effect is that it is possible to automatically respond to a case where a ratio of the clients from a remote place and a near place changes.

According to a thirteenth aspect of the present invention, in the network server sharing system according to the tenth aspect, a plurality of server sharing units are provided and each selected per client and service.

A scale of the connection management module does not depend on the service sharing, so that there is an effect wherein the utilization efficiency of the storage resource (buffer) is enhanced.

There is also such an effect that a sharing target server group can be separately used per service and per client, and a service distribution policy is switched, whereby one single system is capable of executing the service sharing in a variety of forms.

BEST MODE FOR CARRYING OUT THE INVENTION

Embodiment 1

Figure 1:
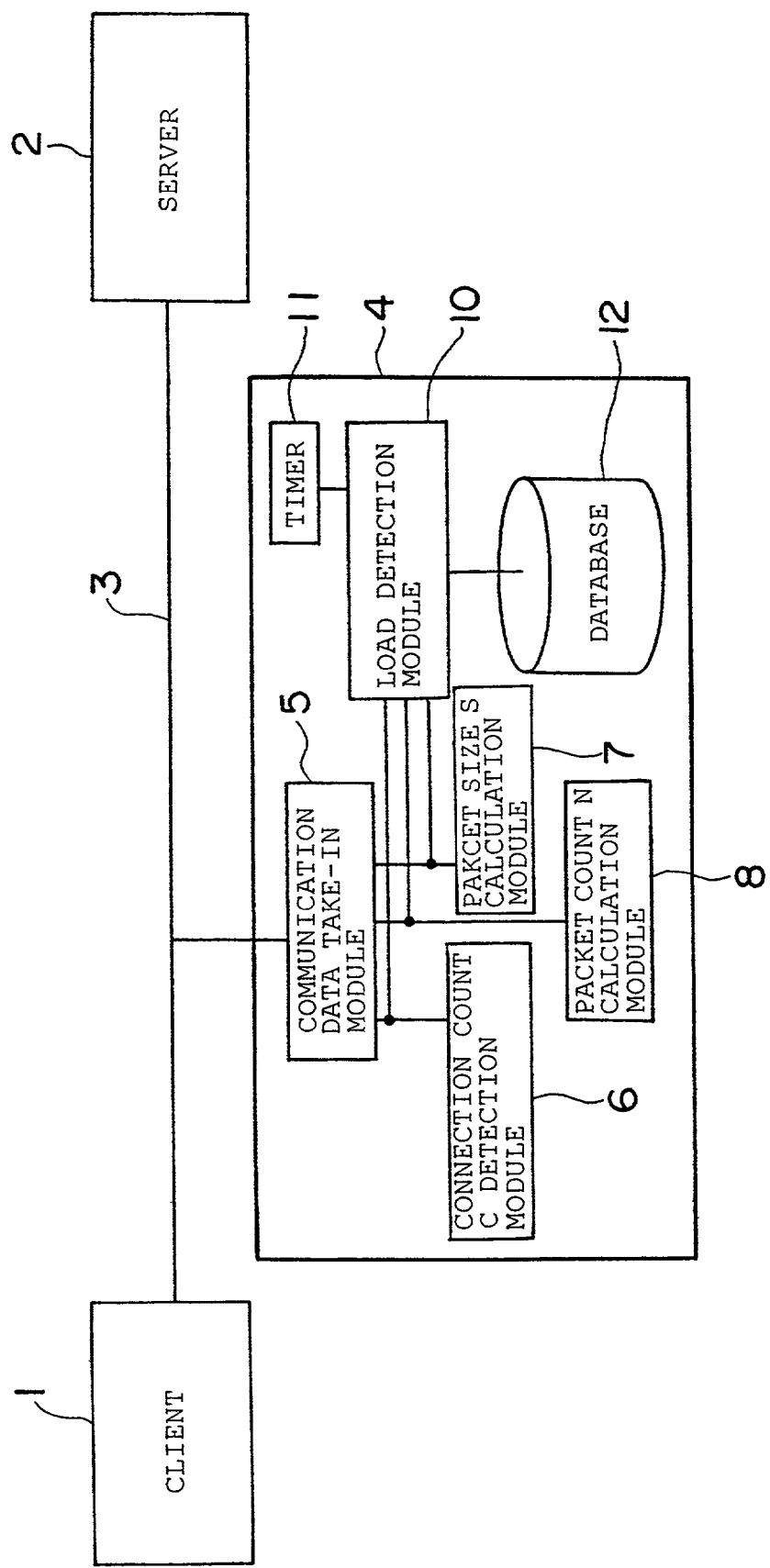
FIG. 1 is a diagram showing a topology of a load detection system in an embodiment of the present invention.

FIG. 1 shows an architecture of functions of a server load detection system 4 in an embodiment 1. As shown in the same Figure, the server load detection system 4 is connected to a communication line 3 linked to a client 1 and a server 2 and, to be specific, can be implemented in a router etc.

This server load detection system 4 includes, as shown in the same Figure, a communication data take-in module 5 for taking in packet data (TCP packet: Transmission Control Protocol Packet) forwarded via the communication line 3. A connection count detection module 6, a packet counter module 8 and a packet size calculation module 7 are connected to this communication data take-in module 5.

The connection count detection module 6 has a function of detecting a connection count C per unit time from the TCP packets taken in by the communication data take-in module 5. This connection count detection module 6 adds 1 when detecting a SYN packet representing a head packet, and subtracts 1 when detecting a FIN packet representing the last packet. The number of clients connected to the relevant server at the present can be thereby detected.

The packet counter module 8 has a function of counting a packet count N of the TCP packets taken in per unit time by the communication data take-in module 5. The packet size calculation module 7 has a function of calculating a total size S of the TCP packets taken in per unit time by the communication data take-in module 5.

Calculation/count data of these modules are transmitted to a load detection module 10, wherein a load is judged based on a predetermined arithmetic process that will be explained later on.

The packet total size S calculated by the packet size calculation module 7 is sequentially increased by a packet size of the packet reached each time, wherein the size S is set to 0 when starting the count. Note that a size of each of the SYN and FIN packets is smaller than the data packet, and its influence on the server load is small enough to be ignored.

The packet count N of the packets counter by the packet counter module 8 adds 1 each time the packet is reached, wherein the packet count is set to 0 when starting the count.

Note that the count of the SYN and FIN packets may be ignored for the reason elucidated above.

The packet counter module 8 continues to count till N exceeds a certain value Nmin, however, if a count time from the start is shorter than a preset time Tmin even though over Nmin, the count still continues till the time Tmin elapses.

Herein, Nmin and Tmin are previously set in the packet counter module 8. Thus, Nmin and Tmin are used in combination, and this makes it feasible to reduce a calculation error occurred due to a small sample count detecting the load, to avoid an overflow occurred due to the sample count being too much, and to enhance a load detection accuracy.

The load detection module 10 detects the load by executed the following arithmetic processes.

To start with, the load detection module 10, when receiving the connection count C from the connection count detection module 6 and the packet size S from the packet size calculation module 7, obtains a server load index value L on the basis of the formula that follows.

Note that T is herein a measurement time measured by a timer 11. If the packet count N indicating the samples exceeds Nmin when Tmin elapses, the measurement time T is set such as T=Tmin.

$$L=(S/C)/T$$

where L is a data transfer quantity per connection for the unit time. A load of the server 2 can be detected by use of L.

Further, the load detection module 10 updates a throughput limit prediction value Lmax. Herein, an initial value of Lmax is 0, and, if L exceeds Lmax, a value of Lmax is set as L. Herein, if the following relationship between L and Lmax is established, it may be judged that the server is under a high load.

$$L < \alpha L \, max \quad (1)$$

where $0 < \alpha <= 1$, and $\alpha$ is a preset constant.

Figure 3:
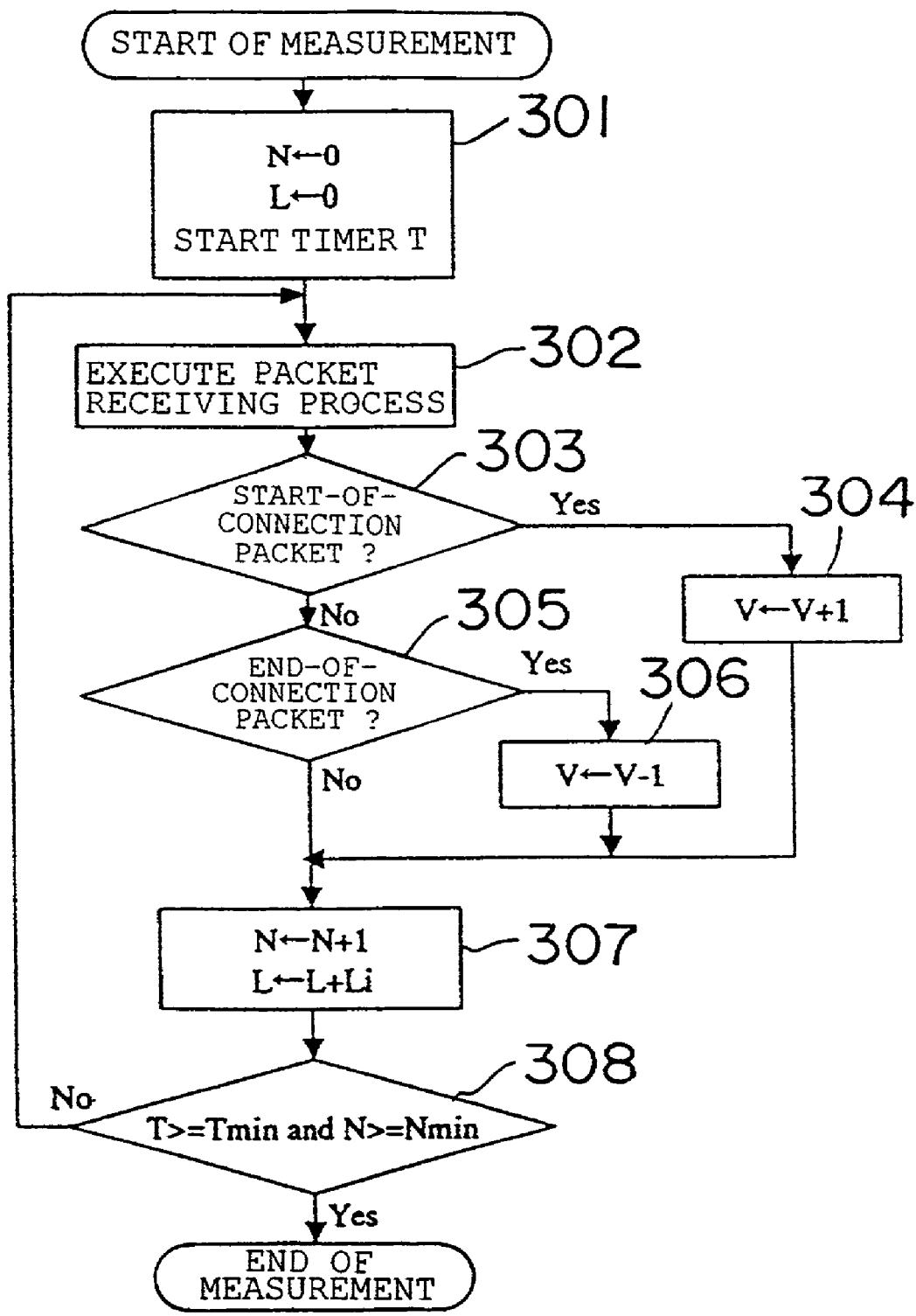
FIG. 3 is a flowchart (1) showing a packet monitoring method in an embodiment 1.

FIG. 3 is a flowchart showing how the load detection module 10 described above detects the load.

To begin with, upon a start of counting, the packet count N and the server load index value L are reset, and the timer 11 is started up (step 301). Then, when starting a receipt of the packet via the communication data take-in module 5 (302), it is judged whether or not the packet is a start-of-connection packet SYN (303) and whether or not the packet is an end-of-connection packet FIN (305), respectively. Herein, if being the start-of-connection packet SYN, a variable V is incremented by 1 (304). Further, if being the end-of-connection packet FIN, the variable V is decremented by 1 (306).

Next, the packet count N is incremented by 1 each time a new packet is received, and the load detection module 10 calculates the server load index value L (307). This calculation is conducted based on the calculation formula explained before. Then, if the server load index value L exceeds α Lmax in the formula (1) given above, it is judged that the server is in the high-load state.

An end of this high-load judgement is triggered when the timer value become equal to or larger than the preset time Tmin and when the packet count N becomes equal to or larger than the preset value Nmin (308).

Herein, according to TCP, the server 2 shares storage resources (buffers) for storing the packet data forwarded from the client 1 evenly per connection. The server 2 notifies the client 1 of a data size storable in the storage resource (buffer) when received next time. The client 1 sends the data size of which the server 2 has notified, to the server 2 via the communication line 3.

Accordingly, the server 2, when coming to the high load, becomes incapable of immediately processing the data sent from the client 1, and hence all or some pieces of data remain stored in the storage resource (buffer) of the server 2. As a result, the server 2 has no alternative but to notify the client of a data size smaller by the data remaining stored in the storage resource (buffer).

Figure 2:
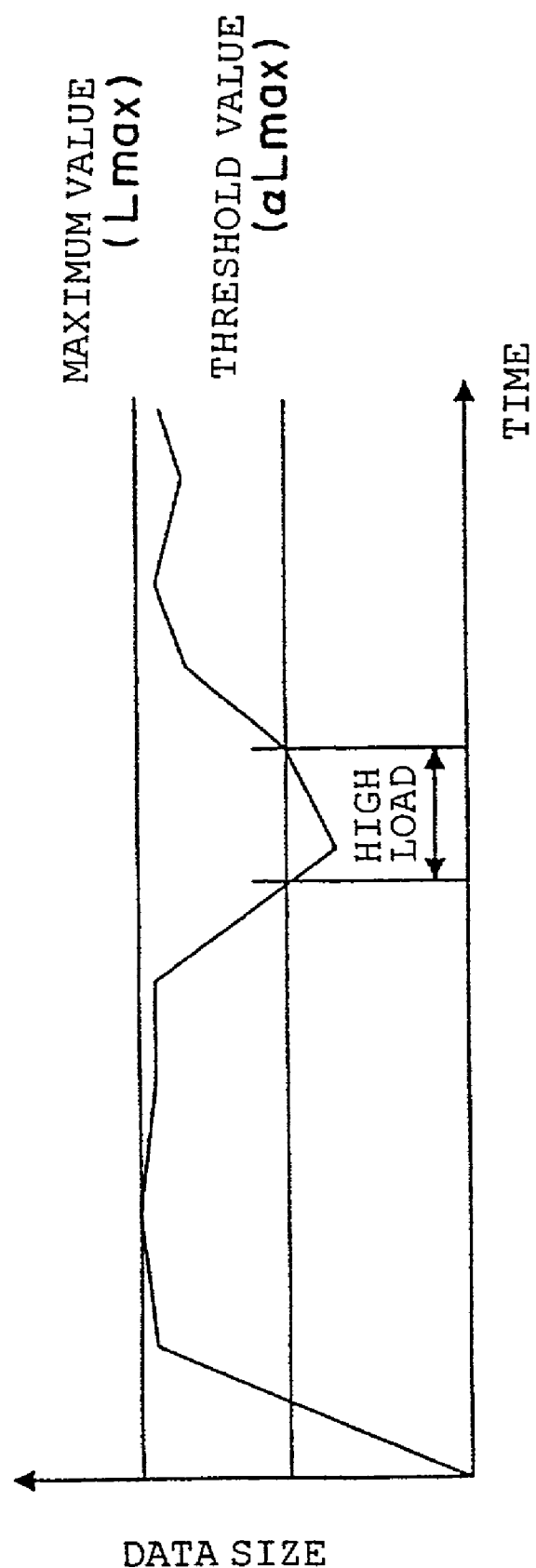
FIG. 2 is a graph showing a relationship between a time and a data size for assistance of judging a high load of a server in the embodiment.

Herein, TCP is a protocol designed for transferring and receiving the data of which a size is as large as possible, and therefore the data size of the data transmitted to the server from the client 1 is maximum in a state before the server 2 comes to the high load. Thereafter, when the load on the server 2 increases, the data size of the data forwarded on the communication line 3 also decreases. In this embodiment, as shown in FIG. 2, the high-load state of the server is detected with an emphasis that the data size decreases.

In this embodiment, the database 12 is stored with the data, wherein the data size of the data forwarded on the communication line 3 in the state before the serve 2 comes to the high load, has the maximum value Lmax. Then, as shown in the formula (1), the value (threshold value) obtained by multiplying Lmax by the constant α is compared with L. When L becomes equal to or smaller than the threshold value, it is judged that the server 2 is in the high-load state.

Thus, in this embodiment, it is possible to prevent a misjudgment with a reduction in the data total size due to the decrease in the connection count itself by checking the data size per connection, and the misdetection of the high load due to L-fluctuations occurred by a disturbance can be prevented by use of the constant α.

Figure 4:
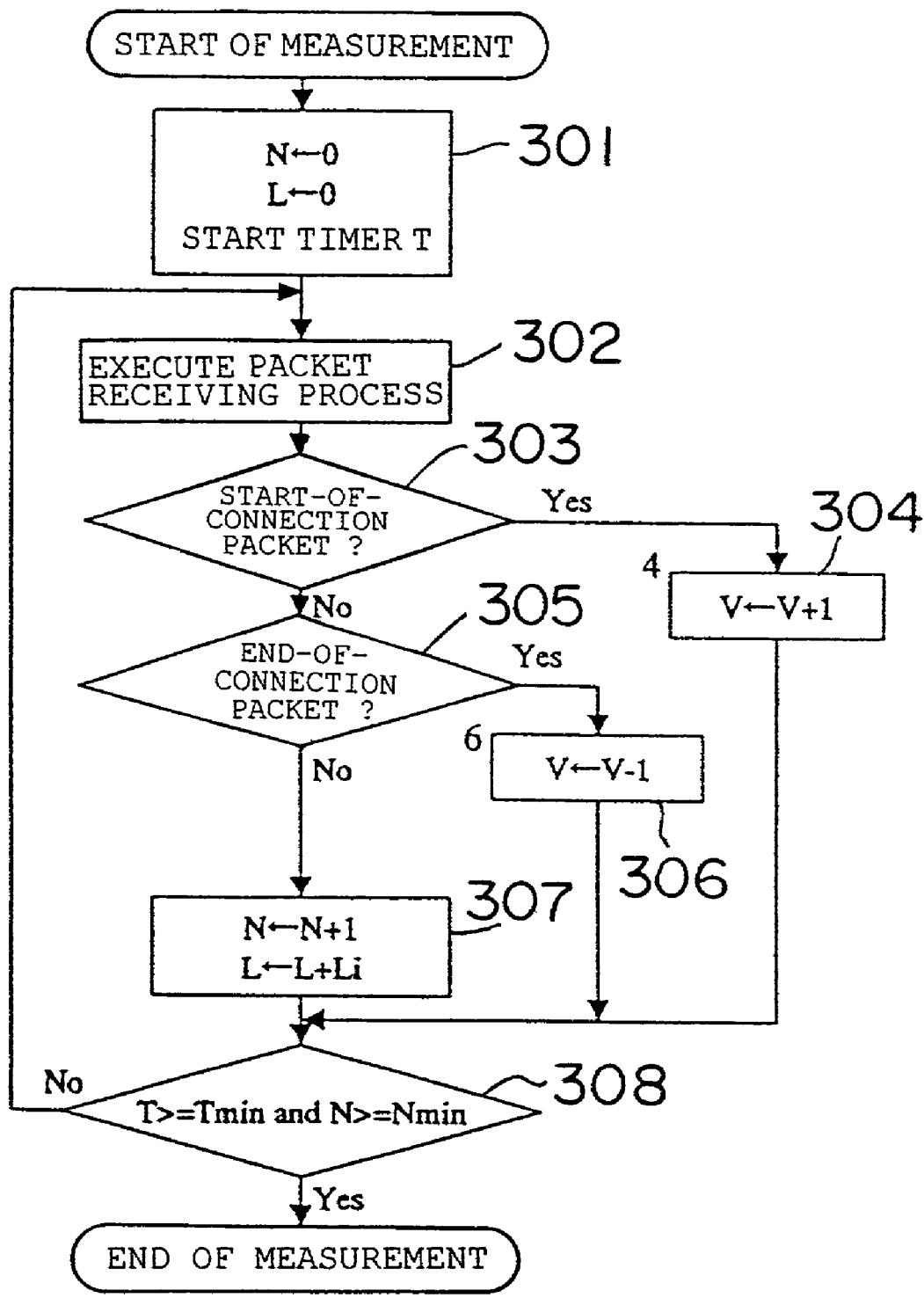
FIG. 4 is a flowchart (2) showing the packet monitoring method in the embodiment 1.

Note that FIG. 4 is a flowchart that is substantially the same as the flowchart in FIG. 3, and shows steps of judging the high load without considering the start-of-communication packet SYN and the end-of-communication packet FIN.

Embodiment 2

An embodiment 2 exemplifies a high-load detection method using a re-forwarding process to the server 2 from the client 1.

A system architecture used in the embodiment 2 is substantially the same as that shown in FIG. 1 in the embodiment 1, and hence its explanation is omitted.

In the embodiment 2, the information of the individual start-of-communication packet SYN is recorded in the database 12 (see FIGS. 6(a)~6(c)). Then, the information of the individual start-of-communication packet SYN is identified by a tuple of a client address (IP), a client port number (sp) and a server port number (dp).

According to TCP, when the server 2 receives the start-of-communication packet SYN from the client 1, sends a SYN receipt acknowledgement packet back to the client 1. Herein, if the client 1 is unable to receive the SYN receipt acknowledgement packet from the server 2 even when a fixed period of time elapses, the start-of-communication packet SYN is re-forwarded to the server 2.

Figure 5:
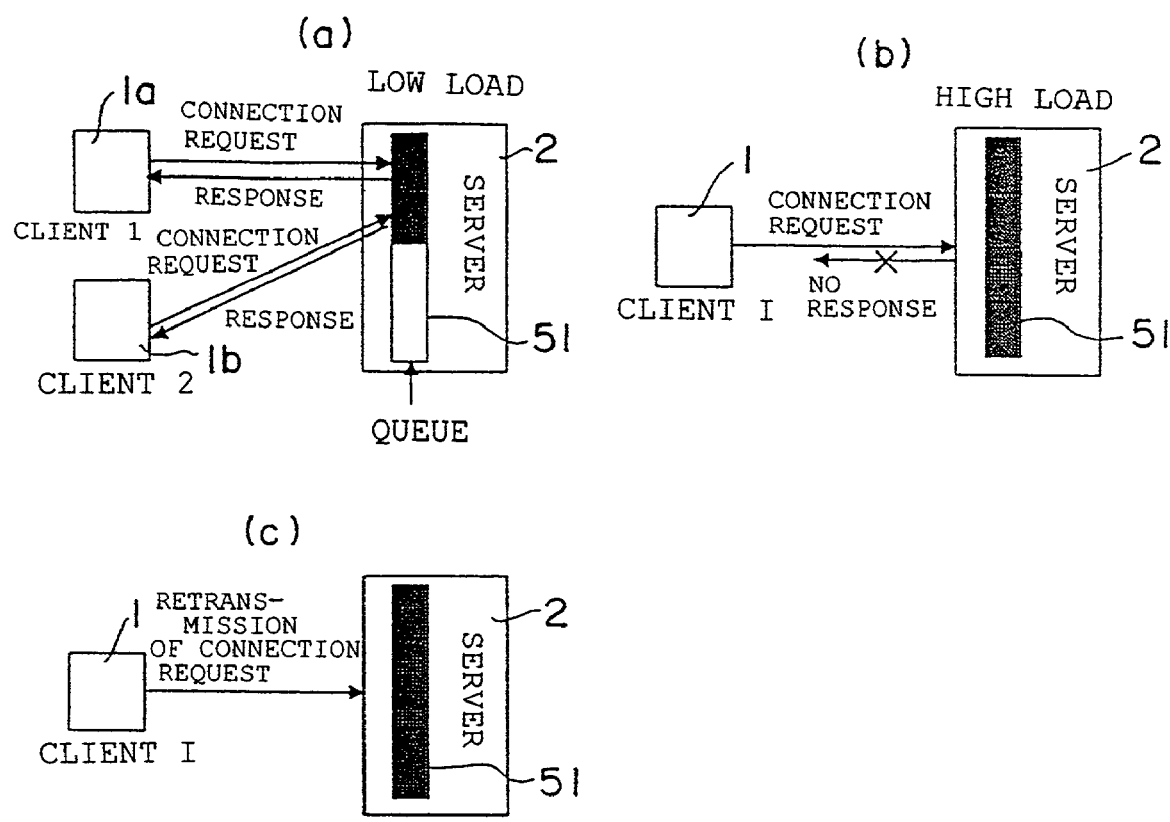
FIG. 5 is an explanatory diagram showing a connection request from a client to the server, and a response process corresponding to a state of a buffer.

FIG. 5 shows this concept. Referring to FIG. 5(a), at first the client 1a sends a connection request (the start-of-communication packet SYN) to the server 2. On the other hand, the other client 1b also sends the connection request (the start-of-communication packet SYN) to the server 2. Herein, if a buffer 51 of the server 2 has an allowance, i.e., if in a low-load state, the server 2 sends a response notification (receipt acknowledgement packet) to the clients 1a and 1b. whereas if the buffer 51 of the server 2 has no allowance, as shown in FIG. 5(b), any response to the connection request (the start-of-communication packet SYN) from the client 1 can not be made. Then, the client 1, as shown in FIG. 5(c), if unable to receive the response notification (receipt acknowledgement packet) from the server 2 within the fixed period of time, resends the connection request to the server 2.

In the embodiment 2, the connection count detection module 6 counts a number Cs of the start packets SYN, and the number of re-forwarding processes of the start packet SYN from the client 1 is detected, thereby calculating a rate Rs of the number of re-forwarding processes of the start packet SYN. This rate Rs is set as a server load index value Crs.

Figure 6:
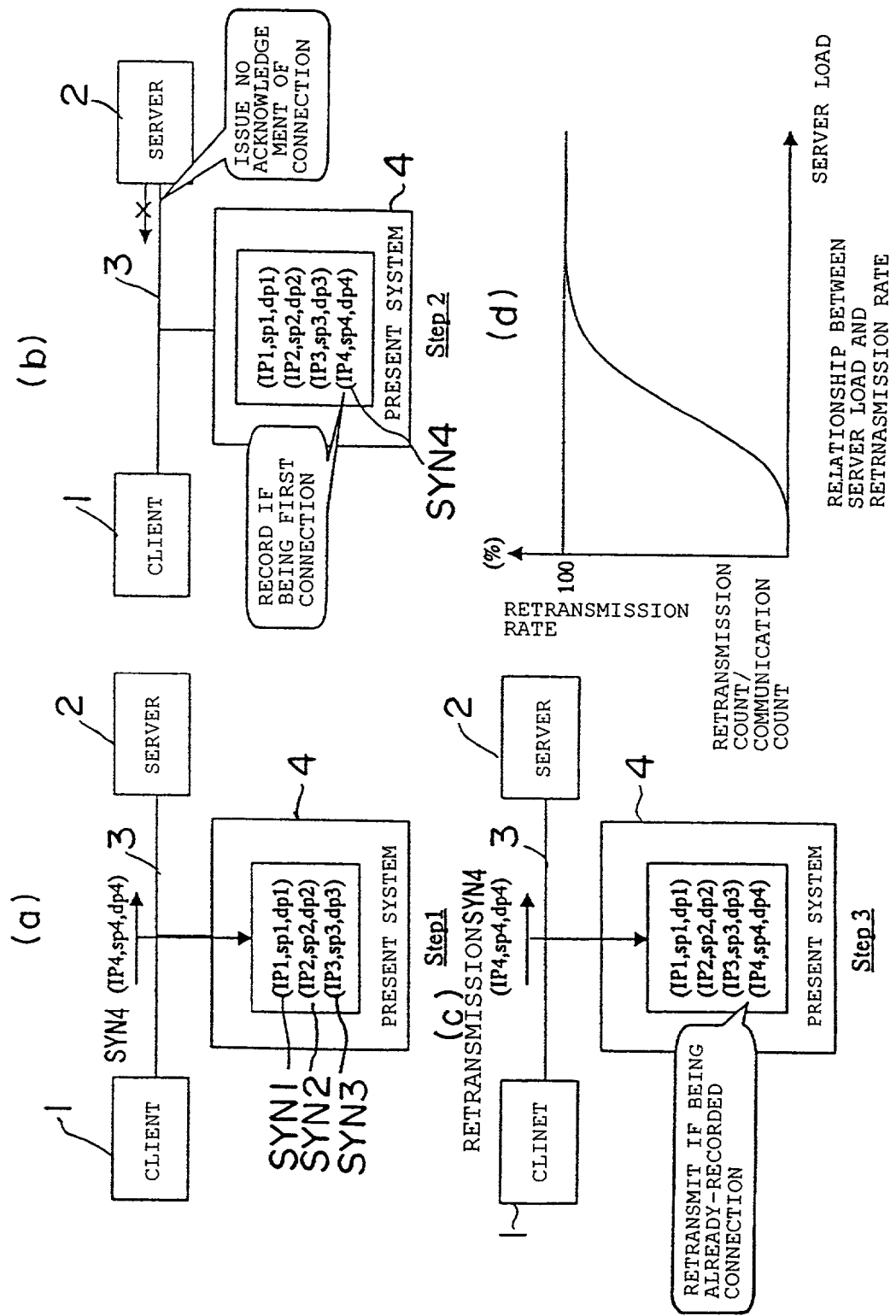
FIG. 6 is an explanatory diagram showing a retransmission of the connection request from the client to the server.

Herein, the start packet SYN can be judged to be re-forwarded if the SYN information extracted from the start packet SYN has already been recorded in the database 12. FIG. 6 shows how this is. Referring to FIG. 6(a), SYN1 (IP1, sp1, dp1), SYN2 (IP2, sp2, dp2) and SYN3 (IP3, sp3, dp3) are recorded as the SYN information in the database of the load detection system 4. At this time, the client 1 sends the connection request (start packet SYN4) to the server via the communication line 3. The load detection system 4, if this connection request is a connection request that is not stored in the self-database 12, i.e., if this is the first connection request, stores this connection request (SYN4: IP4, sp4, dp4) in the same database 12 (FIG. 6(b)).

Then, if the server 2 does not notify-the client 1 of any response to this connection request (SYN4), the client 1 resends the same connection request (SYN4) to the server 2. The communication data take-in module 5 takes in this connection request (SYN4), and the load detection module 10 searches the database 12, whereby the load detection system 4 knows that the connection request has already been stored in the system 4 itself and, as a result, judges that the same connection request (SYN4) is a reconnection request.

A specific counting method in the load detection module 10 is based on the count method of the connection count C and the detection method of the packet size S that explained in Embodiment 1.

Herein, if the following formula (2) is established with respect to the obtained rate Rs of the number of re-forwarding processes of the start packet SYN, i.e., Crs, the server 1 is judged to have the high load.

$$Crs > \beta \qquad (2)$$

where $0 < \beta < 1$, $\beta$ is a preset constant.

The server 2 shares the buffers 51 for storing the data from the client 1 per connection. If the buffers 51 to be shared are consumed up, the response notification (SYN receipt acknowledgement packet) is not sent back to the client 1 without making the connection. Therefore, it follows that the client 1 has an increased rate of the re-forwarding processes of the start packet SYN. Accordingly, the server's high load can be detected from the formula (2). FIG. 6(d) is a graph showing a relationship between the re-forwarding ratio (the number of re-forwarding-processes/the number of communications) described above and the server load.

Note that the constant β in the formula (2) given above is set for preventing the mis-detection due to the disturbance and the momentary high-load state. The momentary high-load state has a small probability of occurrence but does not last long, and may therefore be ignored.

Embodiment 3

An embodiment 3 exemplifies a technology of making a distinction of a count target depending on the communication data size when detecting the load. Note that the system architecture in the embodiment 3 is also substantially the same as that shown in FIG. 1, and is therefore explained referring to FIG. 1.

In the embodiment 3, the load detection module 10, if the following relationship between a packet size Si of the packet from the client 1 and Ds is established, detects the load without adding Si to the packet total size L.

$$Si < \gamma Ds \qquad (3)$$

where $0 < \gamma < 1$, $Ds = f(S1, S2, \ldots Si-1)$, $\gamma$ is a present constant, Ds is a function for obtaining a distribution index of the packet size counted, and may be set as a mean value. Further, if given a plurality of values as a result value of Ds, these values may be set as a single value by a weighted addition and selection.

According to TCP, the client 1, after the connection, sets the transmission data size smaller than the data size of which the server 2 has notified, then starts the transmission and gradually increases the data size up to the data size notified. Therefore, the packet size given from the client 1 shortly after starting the connection is small irrespective of the load on the server 2.

Accordingly, if there are a large number of the clients 1 shortly after the start of the connection, the data transfer quantity L in the formula (1) is estimated small because of a multiplicity of small pieces of transmission data, and there might be a possibility in which accuracies of measuring the load and detecting the high load decline.

Figure 7:
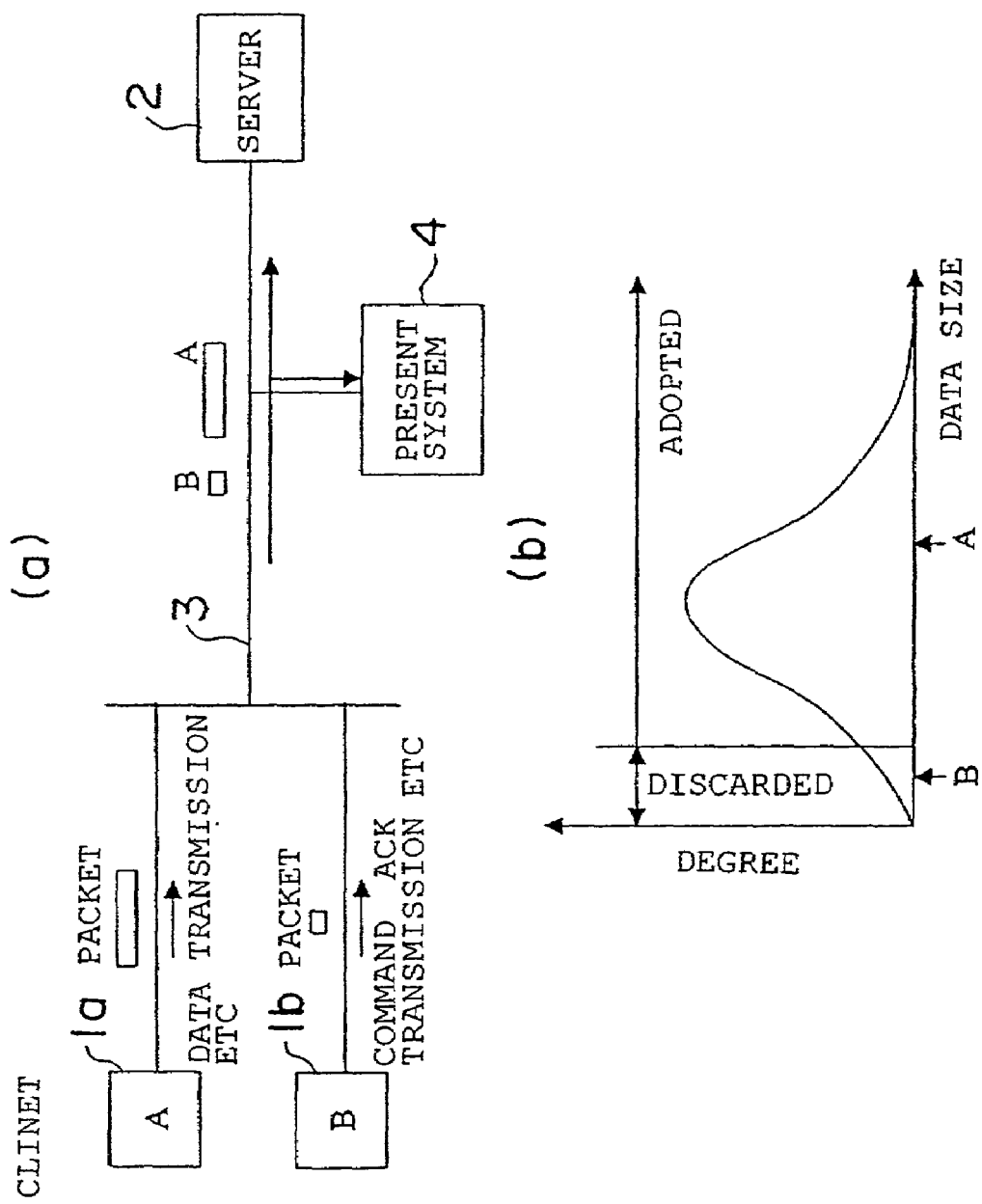
FIG. 7 is an explanatory diagram showing an example of distinguishing whether the data is set as target data depending on a data size in load detection.

FIG. 7 shows conceptually how this is. Referring to FIG. 7(a), the client 1a forwards packet data A having a comparatively large size to the server 2. The client 1b, however, forwards packet data B having a comparatively small size such as a command and a response signal because of being soon after the start of the communication. If such a small size of packet data may be ignored when detecting the load on the server, no problem may arise.

Such being the case, in accordance with the embodiment 3, by use of the formula (3), the packet from the client 1 shortly after the start of the connection is detected and ruled out of the count target, thereby enhancing the accuracies of measuring the load and detecting the high load.

When the server comes to the high load, the data size of the data from all the clients connected decreases, however, the reduction in the buffers 51 for storing the data is comparatively moderate, and hence the decrease in L also moderate. Further, it is low in terms of the probability that all the clients start the new connections at one time, so that the formula (3) is sufficient.

A lower limit value Dsmin of Ds is set as an applied condition in the formula (3) in order to increase the accuracy, and, if Ds is equal to or smaller than Dsmin, the formula (3) is not applied. Namely, Si may be added to L.

Embodiment 4

An embodiment 4 exemplifies a technology of preventing a misdetection of the server high load due to a packet contradiction occurred by a congestion etc on the communication line when detecting the load in the discussion on the embodiment 1.

A system architecture in the embodiment 4 is the same as that in FIG. 1. Herein, of the packet from the client 1 to the server 2, a tuple (packet identifier) of a client address (IP), a client port number (sp) and a server port number (dp) and a sequence number are, from the start of the connection down to the end thereof, stored in the database 12. At this time, the sequence number stored is to be a maximum value (the final value at that point of time).

The load detection system 4, when receiving the packet forwarded from the client 1 to the server 2, obtains the packet identifier and the sequence number Pi from this packet, and compares it with a sequence number Pj of the same packet identifier stored in the database 12.

Herein, if a relationship such as Pi<Pj is established based on a judgement of the load detection module 10, it can be known that a pass-by of the packet occurs on the communication line 3, or a packet is re-forwarded because of the on-the-way packet disappearing.

Figure 8:
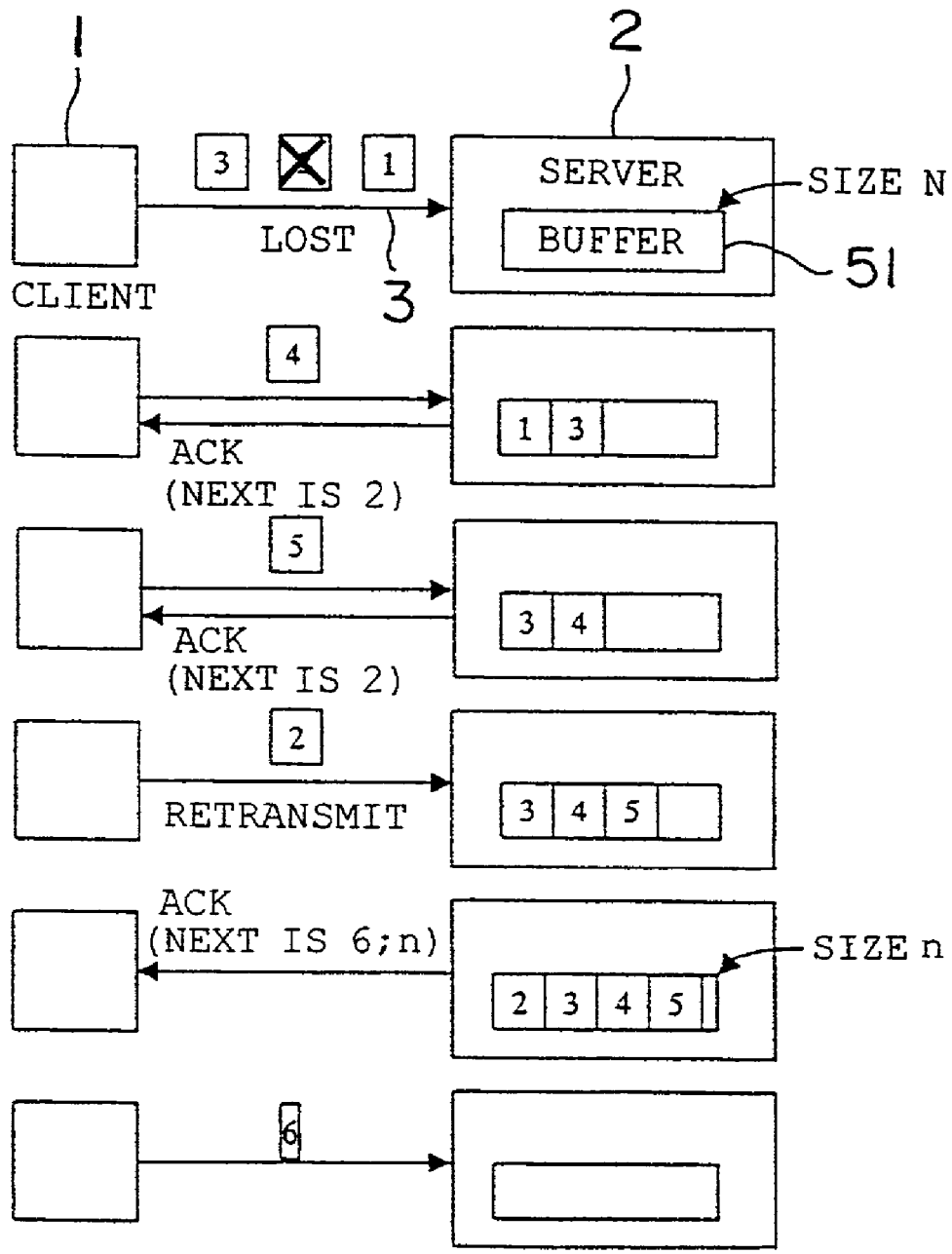
FIG. 8 is an explanatory diagram showing a process of the server based on a sequence number.

In any case, it follows that the data received by the server 2 in that state have a loss midways, and the server 2 is incapable of processing the data after the lost part. It follows that the data after the lost part remains stored in the buffer 51. The data size receivable by the server 2 is thereby decreased, however, the cause is not the server load but a congestion etc on the route between the client and the server. FIG. 8 shows conceptually how this is. In FIG. 8, pieces of packet data [1~3] are transmitted to the server 2 from the client 1, and only the packet data [2] is lost by a factor such as the route congestion etc. The client 2 stored the packet data [1, 3] received in the buffer 51. Herein, the client 1 is notified of a response (a request for re-forwarding the packet data [2]), however, the packet data [2] is not received in the buffer of the server 2 itself, and hence there occurs a state of being unable to process the data after the packet data [3] already reached.

The client 1, when dually receiving the response notification about the packet data [2], re-forwards the packet data [2]. Thus, the packet data [2~5] have arrived all, whereby the server 2 comes to a state of being capable of processing these piece of packet data received but is unable to immediately shift to the processing. Hence, a buffer free size of which the client 1 is notified is n that is by far smaller than an original buffer size N.

Next, the client 1 transmits the packet data [6] of which a size is storable in a size n of which the server 2 has notified. In fact, however, at the stage of receiving this piece of packet data [6], the packet data [1~5] are being processed, and therefore a broad free space exists in the buffer, so that the high-load state does not occur.

That is, in the embodiment 4, the state shown in FIG. 8 is not judged to be the high load as a rule.

For the reasons elucidated above, the packet Pi with an establishment of Pi<Pj is ruled out of the count. Alternatively, the value may be calculated by giving a certain weight or by further adding Pj−Pi to the packet size in the load detection module 10.

Herein, the calculation of Pj−Pi implies that if a data loss does not occur by adding, to the packet size, a prediction size of the data remaining stored in the buffer 51 within the server 2, there is predicted a receivable data size, i.e., a present packet size of which the server 2 notifies the client 1.

Embodiment 5

An embodiment 5 is that the server 2 monitors the packet data transmitted to the client 1, thereby judging the load on the server 2.

In the load detection system 4 in the embodiment 5, the server 2 monitors a window size total value Sw and a connection count C in the packet forwarded by the server 2 to the client 1. The window size is a receivable data size of which the server 2 notifies the client 1.

A value of the connection count C is obtained by making an increment by 1 when detecting the start packet SYN forwarded from the server 2 to the client 1 and making a decrement by 1 when detecting the end packet FIN. Herein, the counting of Sw and C is the same as in the embodiment 1.

A load index value L3 of the server 2 is obtained by the following formula. T is the same as T in the embodiment 1 but is not necessarily indispensable.

$$L3=(Sw/C)/T \qquad (4)$$

The load index value L3 implies a window size per connection. The following is a method of detecting the high load on the server 2 by use of L3.

To begin with, a throughput limit prediction value L3max of the server 2 is updated. An initial value of L3max is 0, and, if L3 exceeds L3max, a value of L3max is set to L3.

Herein, if the following relationship between L3 and L3max is established, it is judged that the server 2 is under the high load.

$$L3=\alpha 3 \cdot L\ max \qquad (5)$$

where $0<\alpha 3<=1$, and $\alpha 3$ is a preset constant.

Figure 9:
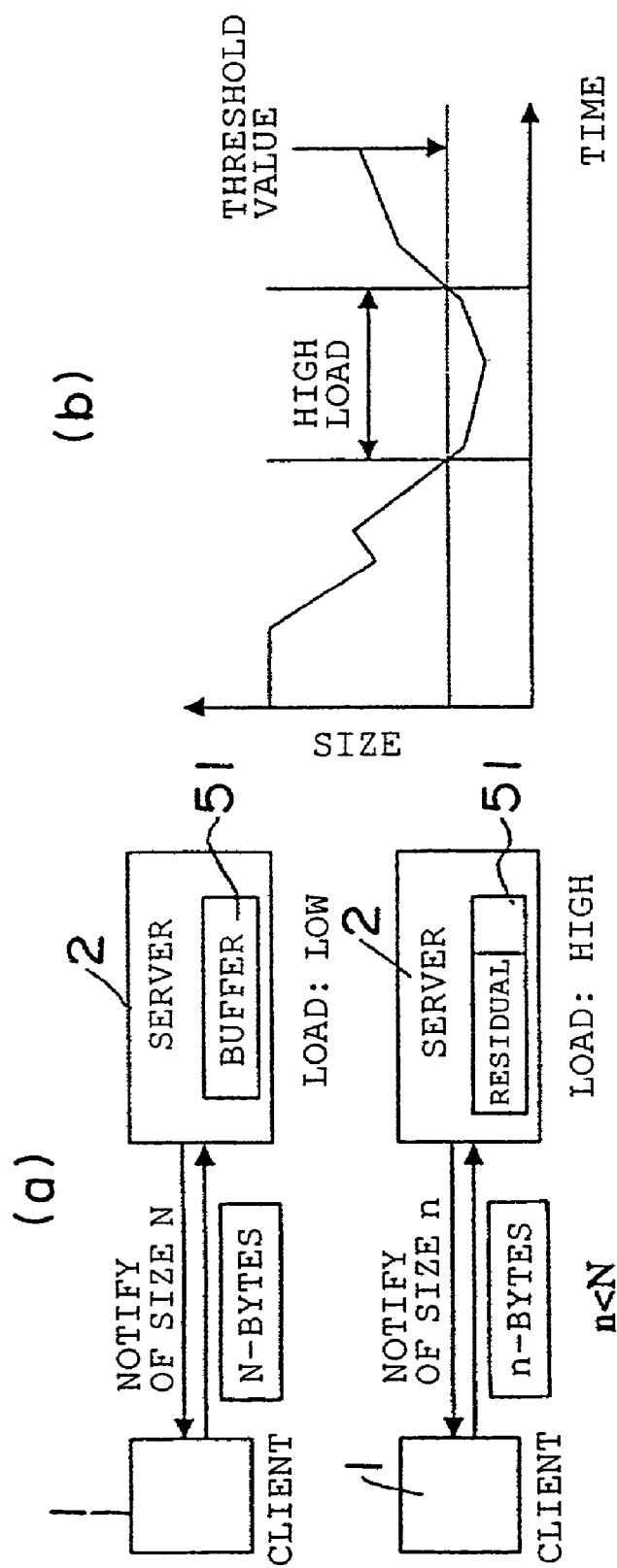
FIG. 9 is an explanatory diagram showing how a communication from the server to the client is monitored.

The server 2 notifies the client 1 of a self-capable-of-processing free size of the buffer 51, i.e., the window size (FIG. 9(*a*)). Herein, however, if the server 2 has an increased load enough to be incapable of completely processing the data transmitted from the client 1, as shown in FIG. 9(*b*), the server 2 notifies the client 1 of the window size n smaller than before (which is more specifically the data size receivable next time). Thus, FIG. 9(*b*) is a graph showing a relationship between the time and the window size of which the server 2 notifies the client.

The load on the server 2 has an influence on all the clients connected, and hence L3 decreases with a rise in the server load. Accordingly, the server load can be calculated by the formula (4), and the high load can be detected by the formula (5).

Embodiment 6

An embodiment 6 shows a case where a server sharing system of the present invention is actualized as a router for routing the TCP packet between the client and the server.

Figure 10:
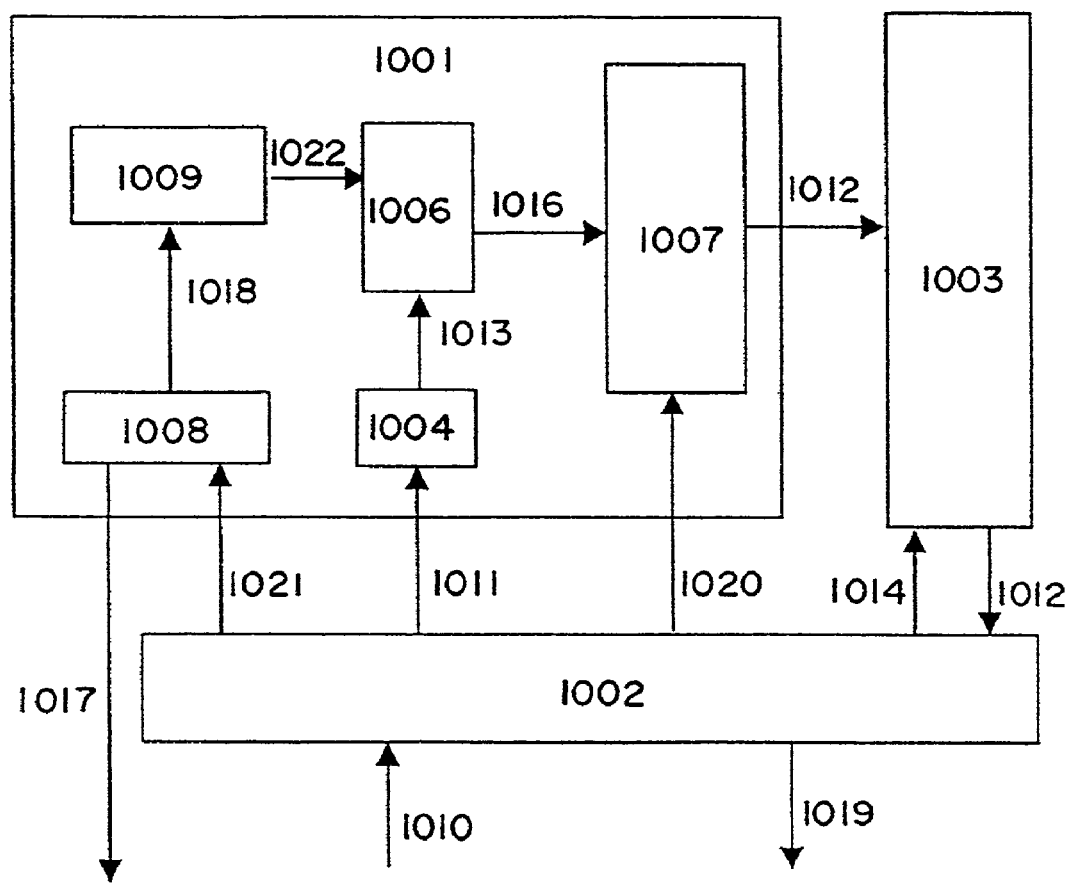
FIG. 10 is a block diagram showing an architecture of a server sharing system in the embodiment.

Referring to FIG. 10, an address translation/packet routing unit 1002, if a packet 1010 received from the client 1 is the start packet SYN implying the connection request, outputs a server sharing indication 1020 to a server selection module 1007 of a server sharing unit 1001 in order to determine a server for sharing the services. Then, the address translation/packet routing unit 1002 gives a count indication 1021 to a client-sided throughput count module 1008.

A server throughput count unit 1004 calculates a throughput of each server and sends result data 1013 to a server sharing probability calculating module 1006. The throughput of each server can be calculated from a response time after transmitting ping, etc to the server 2, or the user may preset the throughput. Further, the server load detection system described in the embodiments 1~5 may also be used.

The client-sided throughput count module 1008, upon an indication given from the routing unit 1002, calculates throughputs 1018 of the client 1 and of the communication line 3, and informs a server sharing probability modification data generating module 1009. Herein, the client-sided throughput may be obtained from a response time after transmitting, for example, ping, etc to the client. Further, the client-sided throughput can be also obtained by use of a band measuring method such as Bprob etc and from past records of the communications about the client 1 as well as from the window size and TTL (Time-To-Live) extracted from the packet.

The server sharing modification data generating module 1009 generates a modification function 1022 with respect to a server sharing probability distribution from the client-sided throughput 1018.

Figure 11:
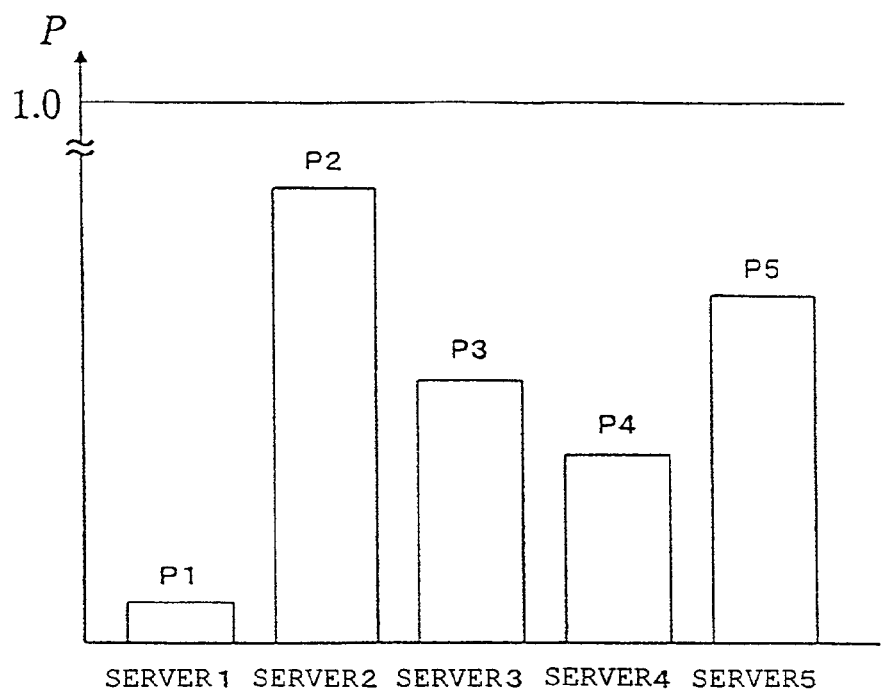
FIG. 11 is a graph for explaining a server sharing probability distribution PsD.
Figure 12:
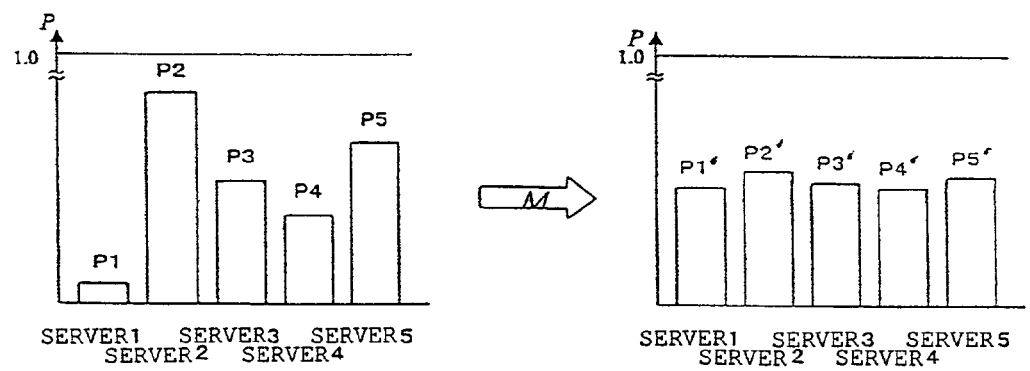
FIG. 12 is an explanatory diagram (1) showing a modification function.
Figure 12:
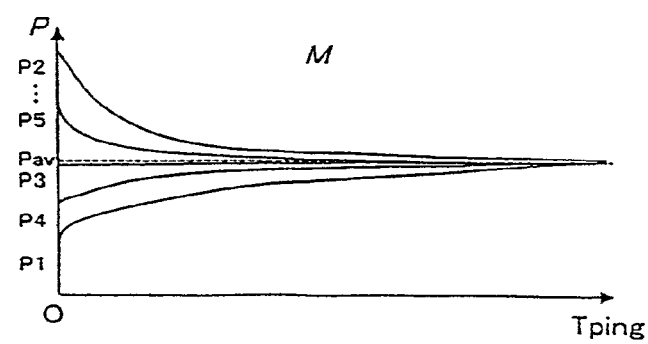

FIG. 11 shows an example of a server sharing probability distribution PsD. FIG. 12 shows an example of a modification function M (1022) in the lower part.

The server sharing probability calculation module 1006 applies the modification function M (1022) to the server sharing probability distribution PsD, thereby obtaining a server sharing probability distribution MPsD.

The probability distribution PsD is set such a distribution that the sharing probability becomes higher as the server has a higher throughput at the present time. For example, let p1, p2, . . . pn (n is the number of servers) be throughput values (which will be explained later on) of the respective servers at the present time, and a sharing probability Pi to the server Si can be obtained by the following formula:

$$Pi=pi/(p1+p2+, \ldots +pn) \qquad (6)$$

The probability modification function M becomes, as shown in FIG. 12, a function for modifying PsD so that PsD is made more approximate to a uniform distribution as the client-sided throughput becomes lower. For example, if a response time Tping based on ping is treated as a client-sided throughput, modified Pi' of each server throughput Pi may also be obtained from the following formula:

$$Pi'=Pi+(Pav-Pi)*2/\pi*\text{arc\_tan}(\alpha *T\text{ping}) \qquad (7)$$

where Pav is an average value of Pi, $\alpha$ is a preset numeral larger than 0, and arc_tan(x) represents tan−1(x).

The modified probability distribution MPsD is obtained from this Pi'.

Figures 13, 14:
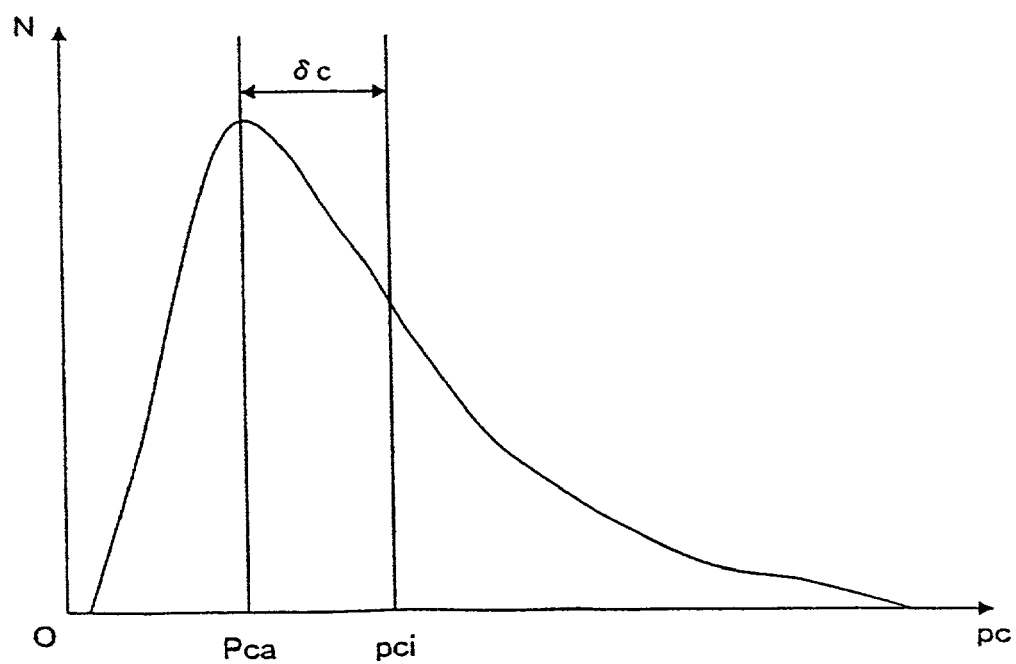
FIG. 13 is a diagram showing one example of a table generated by a server selection module in the embodiment.
FIG. 14 is a graph showing an example of a distribution of client-sided throughput values in the past.

The server sharing probability calculation module 1006 sends the obtained distribution MPsD to the server selection module (1007). The server selection module (1007) is actualized by generating a table shown in FIG. 13 from MPsD, wherein uniform random values taking arbitrary values of 0~1 are used. The table in FIG. 13 is actualized by, e.g., an array of fields each containing a server number, wherein each field contains a tuple of maximum and minimum values in a range Pi of 0~1 and a server address. The server address in the field having a range containing the uniform random number may be set as a service sharing server address. The range of each field is, however, contrived not to overlap with the ranges of other fields.

With respect to the probability distributions of PsD and MPsd, the server throughput values Pi and Pi' may be actualized as a degree distribution. In this case, the uniform random values take a range of 0 up to a total value of all Pi.

The server selection module 1007, after determining the share server, sends a server address 1012 thereof to the connection management unit 1003.

The connection management unit 1003 extracts a tuple of data such as the client address (IP), the client port number (sp), the destination port number (dp) from the start packet SYN or a part of this packet received from the address translation/packet routing unit. Then, the connection management unit 1003 records a mapping of the tuple of data and the server address received from the server sharing unit 1001. Herein, the recording may involve the use of a Hash table with the tuple of data serving as a key. The connection management unit 1003 transmits the server address 1012 to the address translation/packet routing unit 1002.

The address translation/packet routing unit 1002 translate a destination of the packet received from the client 1 into the server address 1012 received from the connection management unit 1003, and transmits the server address 1012 to the server 2.

During the serve, the address translation/packet routing unit 1002 forwards a packet 1014 to the connection management unit 1003. This connection management unit 1003 obtains the share server address 1012 from the tuple of data extracted from the packet 1014, and sends the address 1012 to the address translation/packet routing unit 1002. As in the case of the start packet SYN, the address translation/packet routing unit 1002 translates the destination of the packet received from the client 1 into the server address 1012 received from the connection management unit 1003, and transmits the server address 1012 to the server 2.

When the serve is ended, i.e., when receiving the end packet FIN, though similar to the in-service process, the connection management unit 1003 receiving this packet discards the tuple of data corresponding to the packet.

In this embodiment, the service sharing is determined by use of the probability distribution, thereby facilitating sharing the server exhibiting a higher throughput to the client exhibiting a higher throughput. Therefore, the services can be shared corresponding to how much the server throughput influences QoS such as the response time.

Figure 15:
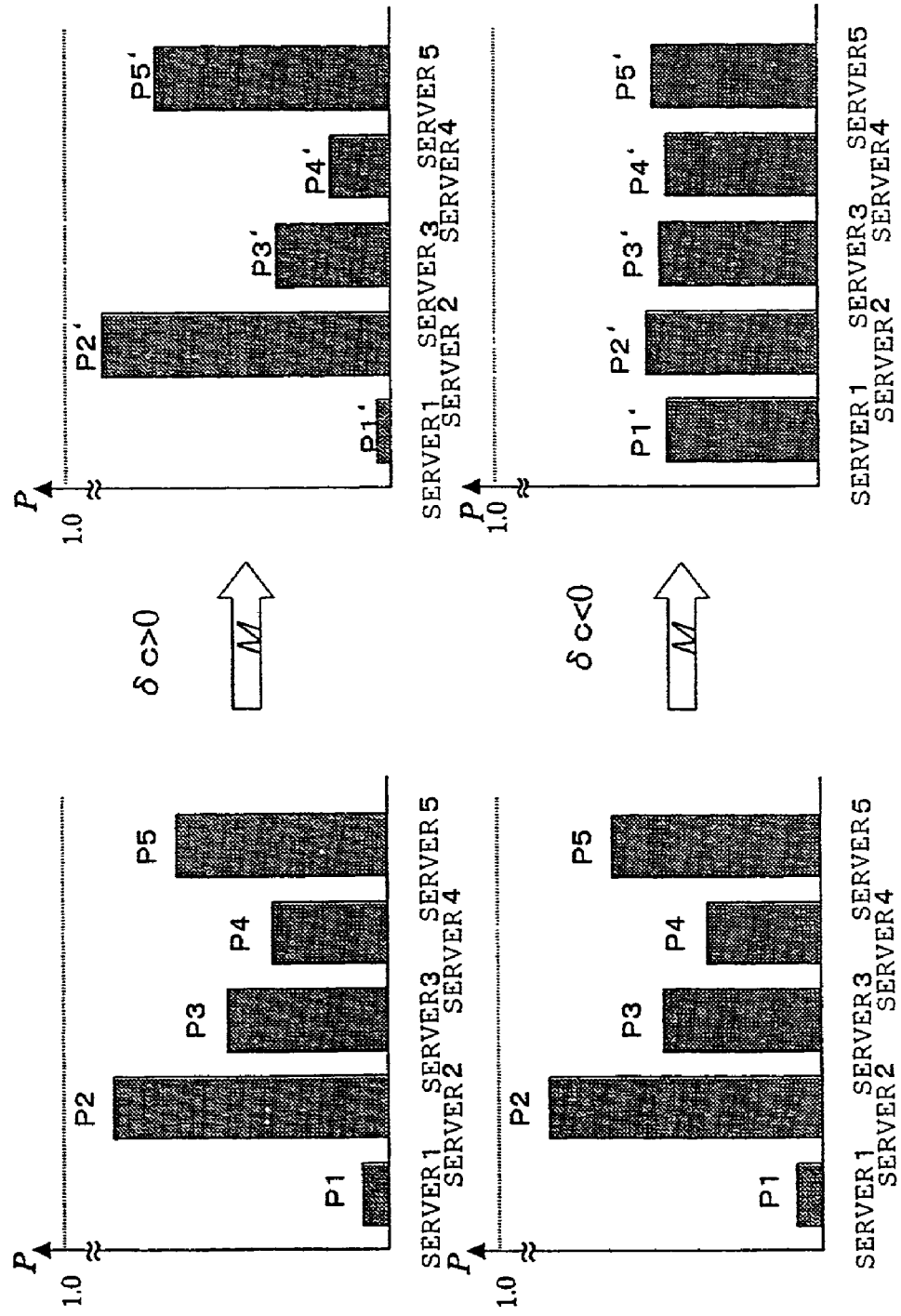
FIG. 15 is an explanatory diagram (2) showing the modification function.

The server sharing probability modification data generating module 1009 of the server sharing unit 1001, obtains a distribution (FIG. 14) of the client-sided throughputs in the past, also obtains a gap δ from the distribution of the client-sided throughput values of a new-connected client, and obtains a gap δc from a distribution of the client-sided throughput values of the new-connected client. Then, the server sharing probability modification data generating module 1009 adds δc to the modification function M, thereby modifying the probability distribution (FIG. 15). Herein, e.g., δc is obtained by the following formula:

$$\delta c = Pca - pci$$

where Pca is a client-sided throughput average value in the past, and pci is a client-sided throughput value of the new-connected client. The modification function M is set so that the server throughput value pi is made more approximate to the average value of all pi as δc becomes smaller and made farther away from the average value as δc becomes larger. If the gap from the average value is set large, however, the modified value pi' of pi must not be a negative number. For example, the formula (7) may be transformed as follows:

$$pi' = pi + (Pav - pi) * \beta * 2/\pi * arc\_tan(\alpha * \delta c + \gamma) \quad (7')$$

where Pav is an average value of pi, α, γ are preset numerals larger than 0, and arc_tan(x) represents tan−1(x). When β is −1, δc<0, and when −dpj/pj, δ>=0. Pj is the minimum value of pi, and dpi=Pav−pj.

Thus, the serve sharing is executed based on the gap from the distribution of the past client-sided throughput values of the client-sided throughput values of the new-connected client, whereby the server sharing corresponding to the client at each point of time can be attained. For example, the server sharing can automatically corresponds to a case where the client ratios from a remote place and a neighboring place fluctuate depending on a time zone.

Further, in this embodiment, a plurality of server sharing units (1001) may be disposed and each selected corresponding to the client address, the client port number and the service port number.

A sharing target server group can be separately used per service and per client, and a service distribution policy can be switched, whereby one single system is capable of executing the service sharing in a variety of forms.

As discussed above, according to the present invention, the server load is measured, and the high load is detected by monitoring the communications between the client and the server. Hence, neither a technical addition to the server is needed, nor packets other than for the services are issued. Accordingly, there are yielded effects, wherein the system is capable of corresponding to any servers, and no interference with the load occurs with a low cost for the introduction. Further, the load measurement and the detection of the high load are performed with the index that does not depend on the protocol, so that an effect is that the system is capable of corresponding to any services. There is also an effect in which the influence of the disturbance is small and the accuracy is high because of monitoring the communication state during the service.

Moreover, when the services provided by the server are shared by the plurality of servers, the loads of the respective servers are automatically efficiently shared corresponding to how much the server throughput has the influence on QoS as viewed from the client, corresponding to the changes in the server architecture and in the server state. Therefore, an effect is that the client is able to receive a prompt supply of the services.

INDUSTRIAL APPLICABILITY

The present invention can be applied to the load measuring system in the network system configured by the servers and the clients.

What is claimed is:

1. A network server load detection method comprising:
   monitoring a communication at a point between a client and a server, the communication being from the client to the server, and the communication including at least one connection having a communication data size;
   detecting a change in the communication data size of the at least one connection of the client and server, wherein the communication data size of the connection is a total packet size per connection over a set measurement time;
   recording a maximum size value of the communication data size of the at least one connection;
   judging, if the detected change of the communication data size of the at least one connection decreases below a predetermined proportion of the recorded maximum size value, that said server is under a high load;
   managing the load of the server according to the judgment of the high load; and
   repeating the detecting and recording in response to the server not being judged to be under a high load.

2. A network server load detection method according to claim 1, further comprising counting a number of connections including the at least one connection and the communication data size until a monitored count of communications reaches a monitored communication minimum count and until a count time reaches a monitor minimum time.

3. A network server load detection method according to claim 1, further comprising recognizing communications of a start and end of the connection, and excluding communication data sizes of the start and end of the connection from the calculated load.

4. A network server load detection method according to claim 1, further comprising:

retaining information of the communication of the start of connection till the connection is ended or established;

detecting the communication of the start of connection for re-connection executed when judging that said client fails to connect on the basis of the information retained; and setting a rate at which the communication of the re-connection occupies the number of the communications of the start of connection as a load of said server and, if this rate is high, judging that said server is under the high load.

5. A network server load detection method according to claim 1, further comprising:

obtaining a distribution of the communication data sizes from said clients;

distinguishing between extremely small pieces of communication data unrelated to the load of said server from the communication data size distribution; and eliminating the extremely small pieces of communication data from the judgement about the load.

6. A network server load detection method according to claim 1, further comprising:

obtaining a sequence number from the communication to said server from said client;

retaining a maximum value of the sequence number till the connection is ended since the start of connection;

comparing the sequence number of the communication received with the sequence number retained; and excluding, if the sequence number obtained from the communication is smaller than the sequence number retained, this communication from counting.

7. A network server load detection method according to claim 6, further comprising:

counting, if the sequence number obtained from the communication is smaller than the sequence number retained, the communication data after executing a weighting process thereon, or predicting a communication data size when there is no problem on a route from the two sequence numbers, and counting the predicted data size for detecting the load.

8. A network server load detection method comprising:

monitoring a communication at a point between a server and a client, the communication being from the server to the client, and counting a receivable data size and a connection count of which said server notifies said client;

calculating the receivable data size per connection as a server load, wherein the receivable data size per connection is a total window size per connection over a set measurement time;

storing a maximum value of the receivable data size per connection of the monitored communication;

judging, if the receivable data size per connection becomes smaller than a predetermined proportion of the stored maximum value, that said server is under a high load;

managing the load of the server according to the judgment of the high load; and repeating the calculating and storing in response to the server not being judged to be under a high load.

9. A network server load detection system for monitoring a communication at a point between a client and a server, the communication being from the client to the server, and detecting a load state of said server, comprising:

data size calculating means for calculating a size of communication data per connection, wherein the communication data size of the connection is a total packet size per connection over a set measurement time;

storage means for detecting a change in the communication data size per connection of the client and server, and storing a maximum value of the communication data size per connection;

load detection means for detecting a high load of said server when the detected change of the communication data size per connection becomes smaller than a predetermined proportion of the maximum value; and load management means for managing the load of the server according to the detection of the high load.

* * * * *